A. J. SMART.
SCREW-CUTTING DIES.

No. 186,890. Patented Jan. 30, 1877.

Witnesses.
B. C. Pole
H. B. Whitman

Albert J. Smart
Inventor, by
Charles S. Whitman
attorney

UNITED STATES PATENT OFFICE.

ALBERT J. SMART, OF GREENFIELD, MASSACHUSETTS, ASSIGNOR TO THE WILEY & RUSSELL MANUFACTURING COMPANY, OF SAME PLACE.

IMPROVEMENT IN SCREW-CUTTING DIES.

Specification forming part of Letters Patent No. 186,890, dated January 30, 1877; application filed May 10, 1876.

*To all whom it may concern:*

Be it known that I, ALBERT J. SMART, of Greenfield, county of Franklin, and State of Massachusetts, have invented Improvements in Screw-Cutting Dies.

The following description, taken in connection with the accompanying plate of drawings, hereinafter referred to, forms a full and exact specification, wherein are set forth the nature and principles of the invention, by which the same may be distinguished from others of a similar class, together with such parts thereof as are claimed as new, and are desired to be secured by Letters Patent of the United States.

My invention relates to that class of dies which are made use of for cutting screw-threads; and the nature thereof consists in connecting the parts of the die by a cup-headed screw interposed between the parts thereof in such manner as to form a hinge and an interposed taper-headed screw.

In the accompanying plate of drawings—in which corresponding parts are designated by similar letters—

Figure 1:
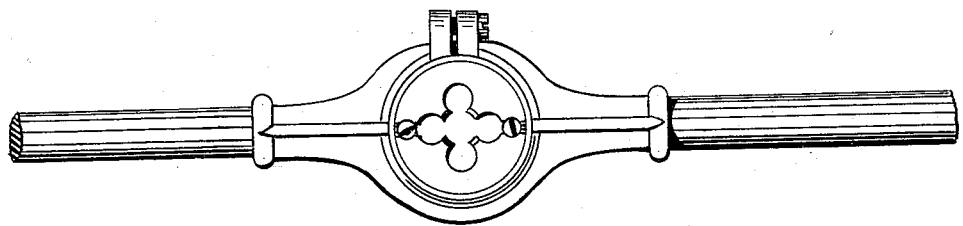
Figure 2:
Figure 3:
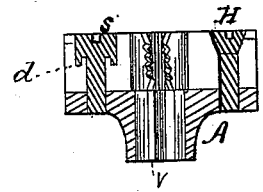
Figure 4:
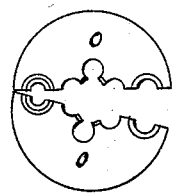

Figure 1 is a plan view, illustrating the die arranged within its holder. Fig. 2 is a side view of one of the parts of the die. Fig. 3 is a vertical section taken in a plane passing through the interposed screws. Fig. 4 is a plan of the top of the die, showing the parts thereof partially separated, and the interposed screws detached therefrom.

In said drawings, A designates the diestock, which consists of a circular plate, provided with a projection, $v$, having an aperture through which the bolt is guided. The parts of the die are provided with recesses $d$, for the reception of the cup-shaped head of the screw $s$, and recesses $b$, for the reception of the taper head of the screws H, both of which screws work in internal screws cut in said holder.

To adjust the die the parts $o$ are turned upon the hinge or pivotal point formed by turning down the screw $s$ until the cup-shaped head thereof enters the recess $d$. When the requisite angle or flexure has been made, the distance between the parts $o$ is accurately adjusted and preserved by means of the taper-headed screw H.

It will be obvious to those skilled in the art to which this invention relates that other hinges of known construction may be substituted for the one described.

I therefore claim and desire to secure by Letters Patent of the United States—

1. A jointed fastening for the parts of the die, consisting of a cup-headed screw fitting within corresponding recesses cut in the parts of the die, as and for the purposes described.

2. The combination of the interposed cup-headed screw, the interposed taper-headed screw, and the parts of the die, as and for the purposes described.

In testimony that I claim the foregoing I have hereunto set my hand and seal this 26th day of April, 1876.

ALBERT J. SMART. [L. S.]

Witnesses:
DWIGHT B. KELLOGG,
PHILIPP TUBALT.